United States Patent
Lim et al.

(10) Patent No.: US 10,691,985 B2
(45) Date of Patent: Jun. 23, 2020

(54) MACHINE LEARNING SYSTEM FOR IN-SITU RECOGNITION OF COMMON LOCATIONS IN A ROTATABLE BODY WITH REPEATING SEGMENTS

(71) Applicant: General Electric Company, Schenectady, NY (US)

(72) Inventors: Ser Nam Lim, Niskayuna, NY (US); David Scott Diwinsky, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 38 days.

(21) Appl. No.: 15/714,208

(22) Filed: Sep. 25, 2017

(65) Prior Publication Data

US 2019/0095765 A1 Mar. 28, 2019

(51) Int. Cl.
*G06K 9/00* (2006.01)
*G06K 9/68* (2006.01)
(Continued)

(52) U.S. Cl.
CPC .......... *G06K 9/68* (2013.01); *F01D 5/005* (2013.01); *F01D 21/003* (2013.01);
(Continued)

(58) Field of Classification Search
CPC .......... G06K 9/68; G06K 9/66; G06K 9/6262; G06K 9/6259; G06K 2209/19; G06T 7/70; G06T 7/0004; G06T 7/0008; G06T 7/20; G06T 2207/30164; G06T 2207/20081; G06T 2207/20084; F01D 5/005; F01D 21/003; F05D 2220/32; F05D 2230/80; F05D 2260/80
See application file for complete search history.

(56) References Cited

U.S. PATENT DOCUMENTS

| 4,987,555 A | 1/1991 | Twerdochlib |
| 8,761,490 B2 * | 6/2014 | Scheid ............... G01N 21/8851 382/145 |

(Continued)

OTHER PUBLICATIONS

Ravikumar, S., et al., "Machine learning approach for automated visual inspection of machine components," Expert Systems with Applications, vol. 38, Issue 4, pp. 3260-3266 (Apr. 2011).

(Continued)

*Primary Examiner* — Ping Y Hsieh
(74) *Attorney, Agent, or Firm* — Christopher R. Carroll; The Small Patent Law Group, LLC (57) ABSTRACT

A system includes one or more processors configured to automatically identify different distressed portions in repeating segments of a rotating body. At least one of a size and/or a shape of one or more of the distressed portions changes with respect to time. The one or more processors also are configured to determine a pattern of the different distressed portions in the repeating segments of the rotating body during rotation of the rotating body based on identifying the different distressed portions. The one or more processors also are configured to subsequently automatically identify locations of individual segments of the repeating segments in the rotating body using the pattern of the distressed portions that is determined.

21 Claims, 4 Drawing Sheets

(51) Int. Cl.
  *G06T 7/00* (2017.01)
  *G01N 21/954* (2006.01)
  *F01D 5/00* (2006.01)
  *F01D 21/00* (2006.01)
  *G06K 9/62* (2006.01)
  *G06T 7/70* (2017.01)
  *G06T 7/20* (2017.01)

(52) U.S. Cl.
  CPC ......... *G01N 21/954* (2013.01); *G06K 9/6262* (2013.01); *G06T 7/0006* (2013.01); *F05D 2220/32* (2013.01); *F05D 2230/80* (2013.01); *F05D 2260/80* (2013.01); *G06K 2209/19* (2013.01); *G06T 7/0004* (2013.01); *G06T 7/20* (2013.01); *G06T 7/70* (2017.01); *G06T 2207/30164* (2013.01)

(56) References Cited

U.S. PATENT DOCUMENTS

| | | |
|---|---|---|
| 9,477,925 B2 | 10/2016 | Seide et al. |
| 2007/0132840 A1 | 6/2007 | Konomura |
| 2009/0066939 A1 | 3/2009 | Venkatachalam et al. |
| 2011/0087352 A1* | 4/2011 | Krause ............... B23P 6/002 700/98 |
| 2011/0138937 A1 | 6/2011 | Fritz |
| 2012/0076345 A1 | 3/2012 | Fritz et al. |
| 2012/0105619 A1 | 5/2012 | Pallikkaragopalan et al. |
| 2013/0113913 A1* | 5/2013 | Scheid ............ G01N 21/8851 348/82 |
| 2013/0162846 A1 | 6/2013 | Xie et al. |
| 2015/0199805 A1 | 7/2015 | Hatcher, Jr. et al. |
| 2016/0178532 A1* | 6/2016 | Lim ................ G01N 21/8851 348/46 |

OTHER PUBLICATIONS

Extended European Search Report and Opinion issued in connection with corresponding EP Application No. 18192349.1 dated Feb. 19, 2019.

* cited by examiner

MACHINE LEARNING SYSTEM FOR IN-SITU RECOGNITION OF COMMON LOCATIONS IN A ROTATABLE BODY WITH REPEATING SEGMENTS

FIELD

The subject matter described herein relates to machine learning image analysis systems.

BACKGROUND

Machine learning can be used to automatically identify objects depicted in images. Machine learning systems can use neural networks to analyze the images for a variety of purposes, such as to automatically identify distress (e.g., damage) to machines. For example, cracks, spalling, pits, etc. in turbine blades or coatings on turbine blades of a turbine machine can be automatically identified by inserting a borescope into the turbine machine and obtaining images of the turbine blades.

But, differentiating the turbine blades from each other can be difficult. Because the turbine blades are so similar in appearance, it can be difficult to track changes in damage to a particular turbine blade over time. The operator of the borescope and the machine learning system may not be aware of which turbine blade is being imaged due to the rotational symmetry of turbine machines. While the turbine machine can be disassembled to differentiate the turbine blades from each other, the disassembly is a time consuming and costly endeavor.

BRIEF DESCRIPTION

In one embodiment, a method includes automatically identifying (using a machine learning system) different distressed portions in repeating segments of a rotating body. At least one of a size and/or a shape of one or more of the distressed portions changes with respect to time. The method also includes determining a pattern of the different distressed portions in the repeating segments of the rotating body during rotation of the rotating body based on identifying the different distressed portions, and subsequently automatically identifying (using the same machine learning system or another machine learning system) locations of individual segments of the repeating segments in the rotating body using the pattern of the distressed portions that is determined.

In one embodiment, a system includes one or more processors configured to automatically identify different distressed portions in repeating segments of a rotating body. At least one of a size and/or a shape of one or more of the distressed portions changes with respect to time. The one or more processors also are configured to determine a pattern of the different distressed portions in the repeating segments of the rotating body during rotation of the rotating body based on identifying the different distressed portions. The one or more processors also are configured to subsequently automatically identify locations of individual segments of the repeating segments in the rotating body using the pattern of the distressed portions that is determined.

In one embodiment, a method includes automatically identifying (using a machine learning system) plural different damaged blades of a turbine engine. At least one of a size or a shape of damage to one or more of the damaged blades changes with respect to time. The method also includes determining a sequential pattern of the different damaged blades of the turbine engine during rotation of the turbine engine based on identifying the different damaged blades, and subsequently automatically identifying, using the same machine learning system or another machine learning system, the damaged blades of the turbine engine after the size, the shape, or both the size and the shape of the damage to the one or more damaged blades changes.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One embodiment of the inventive subject matter described herein provides a machine learning image analysis system and method for in-situ recognition of common locations in a rotatable body with repeating segments. The system and method examine images or video (e.g., frames of a video) of repeating segments of a rotating body, such as turbine blades of a turbine machine. Two or more of the segments may have markings, such as distress or other damage to the turbine blades or coatings on the turbine blades. The systems and methods can autonomously identify the distressed portions on the different segments (e.g., turbine blades) of the rotating, rotatable, or rotary body (e.g., the turbine machine). The systems and methods can determine a pattern of the segments and the distressed portions. For example, the systems and methods can determine that a first crack is identified on one turbine blade, followed by sixteen turbine blades with no identifiable distress, followed by two sequential turbine blades (along a clock or counter-clockwise direction of the machine) having spalling in different locations, followed by two turbine blades with no identifiable distress, followed by a turbine blade having pits in the coating of the turbine blade.

This sequence of blades can be a pattern associated with the rotatable body (e.g., a pattern of crack damage in a turbine blade, sixteen non-distressed blades, two blades with spalling, two blades with no distress, and a blade with corrosion pits). The rotatable body can then be used during one or more operating cycles, where distress to one or more of the repeating segments can worsen or begin. During a subsequent examination of the rotatable body by the system or method, images of the repeating segments can be examined to identify the same turbine blades appearing in the pattern. For example, the identified sequence of distressed and non-distressed turbine blades can be compared to the pattern to determine which blades in this subsequent examination are the same blades as were examined during a prior inspection (e.g., when the pattern was determined). Changes in the size, shape, and/or extent of the distress to the same blades does not prevent the systems and methods from differentiating between the different blades because the pattern of previously identified distress to the blades remains the same. The systems and methods can then compare the previously identified distress with the currently identified distress on the same turbine blades to monitor progression of distress to the blades. At least one technical effect of the subject matter disclosed herein is the more accurate identification and tracking of the progression of distress (e.g., damage) to parts of a machine so that the damaged parts can be maintained, repaired, or replaced prior to catastrophic damage to the machine.

While the description herein focuses on examining turbine blades of a turbine machine, not all embodiments of the inventive subject matter are limited to turbine blades or turbine machines. Any rotating body that is rotationally symmetric can be examined using the systems and methods described herein to allow for the same repeating segment of the body to be tracked over time without having to uniquely mark or otherwise identify the various repeating segments in the rotatable body.

Figure 1:
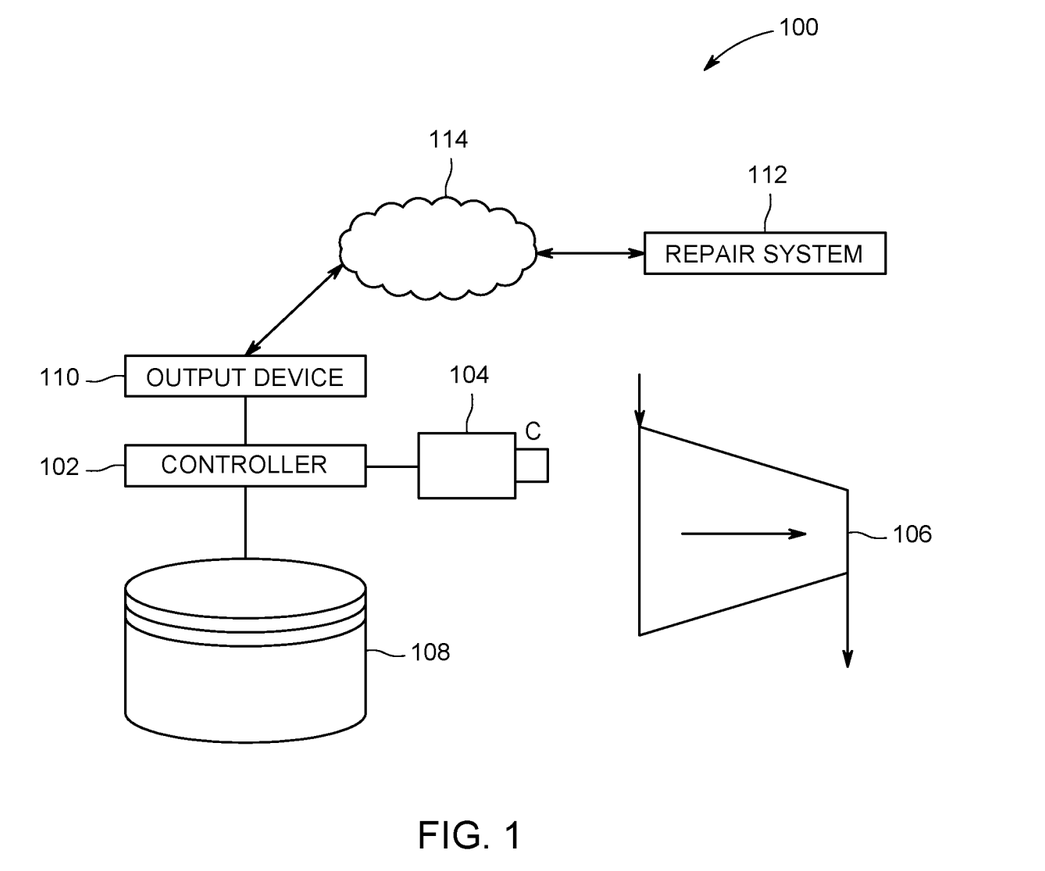
FIG. 1 illustrates one embodiment of a machine learning system.

FIG. 1 illustrates one embodiment of a machine learning system 100. The system 100 includes a controller 102 that receives images from an optical sensor 104, such as a camera. The controller 102 represents hardware circuitry that includes and/or is connected with one or more processors (e.g., one or more microprocessors, field programmable gate arrays, integrated circuits, etc.) that perform the operations described herein in connection with the controller 102.

In one embodiment, the controller 102 is or includes an artificial neural network that uses context guided prediction for object identification in images. The controller 102 can be divided into multiple layers receive an input image from the optical sensor 104, process the image through intermediate layers, and output another image or an identification of an object in the image. The layers can represent different groups or sets of artificial neurons, which can represent different functions performed by the processors on the input image to identify objects in the image.

The optical sensor 104 represents one or more devices that generate image data (e.g., images, videos, video frames, etc.) representative of objects in a field of view of the optical sensor 104. The optical sensor 104 can include one or more cameras that generate images representative of different repeating segments of a rotating, rotatable, or rotary machine 106, such as a turbine machine or engine. In one embodiment, the optical sensor 104 is a small camera, such as a borescope that is sized to fit into the turbine machine and obtain images of the turbine blades without having to open an outer casing or housing of the turbine machine. The repeating segments of the machine 106 can be different turbine blades that sequentially move into and out of the field of view of the optical sensor 104 as the machine 106 rotates. The images generated by the optical sensor 104 are communicated to the controller 102, and optionally can be saved in one or more tangible and non-transitory computer readable storage media 108 (also referred to as a memory), such as one or more computer hard drives, discs, or the like.

The images generated by the optical sensor 104 can each depict a different repeating segment of the rotating machine 106. For example, each image from the optical sensor 104 can depict a different turbine blade or a portion of a different turbine blade. Alternatively, two or more turbine blades or portions of two or more turbine blades can appear in at least one of the images.

The images can be examined by the controller 102 and the controller 102 can attempt to identify objects appearing in the images. For example, the artificial neurons in the layers of the neural network in the controller 102 can examine individual pixels in the images and use linear classification to calculate scores for different categories of objects (referred to herein as "classes"). These scores can indicate the probability that the corresponding pixel represents different classes. Each artificial neuron can apply a mathematical function, such as an activation function, to the same pixel, with the functions applied by different neurons impacting the functions applied by other neurons and different neurons applying different weights to different terms in the functions than one or more, or all other neurons. Application of the functions generates the classification scores for the pixels, which can be used to identify the objects in the images. Alternatively, the controller 102 can be another computerized system that identifies distress in the repeating segments of the rotary body using another technique.

The controller 102 can automatically identify objects in the images, such as distressed portions of the turbine blades. The distressed portions can be cracks, spalling, pitting, or the like, in the turbine blades or coatings on the turbine blades. The controller 102 can generate an output signal that is communicated to an output device 110 and that indicates the distress identified on one or more of the turbine blades. In order to track progression of the distress on one or more of the turbine blades, however, the controller 102 determines a pattern of the distress identified in or on the blades and uses this pattern to identify individual turbine blades.

Figure 2:
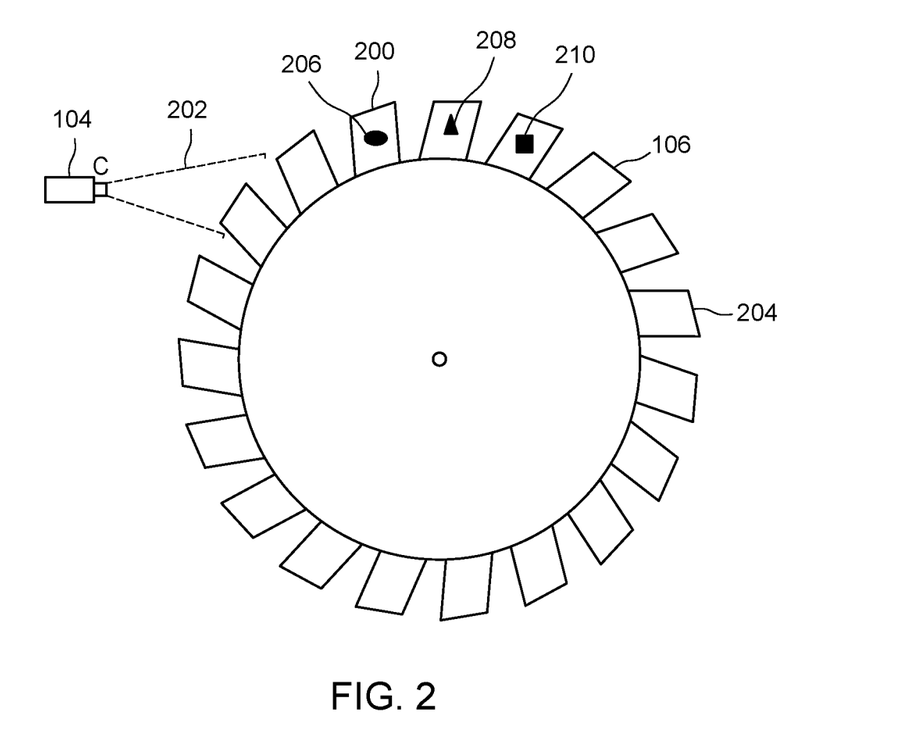
FIG. 2 illustrates one example of a rotary machine shown in FIG. 1.

FIG. 2 illustrates one example of the rotary machine 106. The optical sensor 104 can generate images of different repeating segments 200 of the rotary machine 106 while the repeating segments 200 are located within a field of view 202 of the optical sensor 104. The rotary machine 106 and repeating segments 200 can be rotating around or about an axis of rotation 204 of the rotary machine 106 while the optical sensor 104 captures and generates images of the repeating segments 200. Alternatively, the rotary machine 106 and repeating segments 200 can be stationary while an image is captured of a segment 200, with the rotary machine 106 and segments 200 being rotated after the image is captured so that the next segment 200 is within the field of view 202 of the optical sensor 104.

The controller 102 can examine these images of the individual repeating segments 200 of the rotary machine 106, such as turbine blades, that were acquired while the segments 200 were rotating or while the segments 200 were stationary (with the segments 200 being rotated between image acquisitions). The controller 102 can identify a first distressed portion 206 on a first segment or turbine blade 200, a different second distressed portion 208 on a different second segment or blade 200, and a different third distressed portion 210 on a different third segment or blade 200.

These detected distressed portions 206, 208, 210 can form a pattern or be used to determine a pattern of the rotary machine 106. The pattern can represent or indicate the order in which the distressed portions 206, 208, 210 are encountered during image acquisition or between image acquisitions. For example, if the rotary machine 106 was rotated in a counter-clockwise direction during image acquisition or between image acquisitions, then the pattern would be the first distressed portion 206, followed by the second distressed portion 208 in the very next or neighboring blade 200, followed by the third distressed portion 210 in the very next or neighboring blade 200. As another example, if the rotary machine 106 was rotated in a clockwise direction during image acquisition or between image acquisitions, then the pattern would be the third distressed portion 210, followed by the second distressed portion 208 in the next or neighboring blade 200, followed by the first distressed portion 206 in the next or neighboring blade 200. The type of distress to the segments 200 (e.g., cracks, spalling, pitting, etc.) can vary among the segments 200 or can be the same in two or more of the segments 200.

The pattern optionally can include one or more intervening segments 200 of the rotary machine 106 that are not distressed (or that do not have damaged portions that are detected by the controller 102). For example, a pattern for a rotary machine can be a first distressed portion on a first blade followed by second and third blades with no detected distress, followed by a second distressed portion of a fourth blade, followed by a third distressed portion of a fifth blade, and so on.

The pattern can be used by the controller 102 to track changes in the distressed portions of the repeating segments 200 of the rotary machine 106. The different repeating segments (e.g., turbine blades) of the rotary machine 106 may not be individually numbered or otherwise labeled and, as a result, may not be easily differentiated from each other or individually identified. While some rotary machines 106 may be disassembled to aid in the individual identification of the turbine blades, this can be a time-intensive and expensive process. One or more embodiments of the inventive systems and methods described herein use the pattern of distress that is determined to consistently track the locations of the repeating segments in the rotary body. This allows the systems and methods to consistently identify and differentiate the repeating segments from each other during subsequent examinations of the rotary body. The systems and methods are then able to track changes in the distress to one or more of the repeating segments as the systems and methods can differentiate the repeating segments from each other and determine whether the distress on one or more of the segments is changing over time.

For example, a person may be unable to differentiate between turbine blades during different examinations of the same turbine engine because the turbine blades are largely identical in appearance and because disassembling the turbine engine to individually identify the blades may be too time-consuming and/or costly. Additionally, previously identified distress or other damage to a turbine blade may change in size and/or shape between consecutive examinations, which prevents the distress or damage from being used as an identifying marker for the turbine blade. As a result, a person is unable to track if the damage to any one turbine blade is worsening as the person cannot distinguish between the turbine blades and cannot identify the location of any particular turbine blade.

Figure 3:
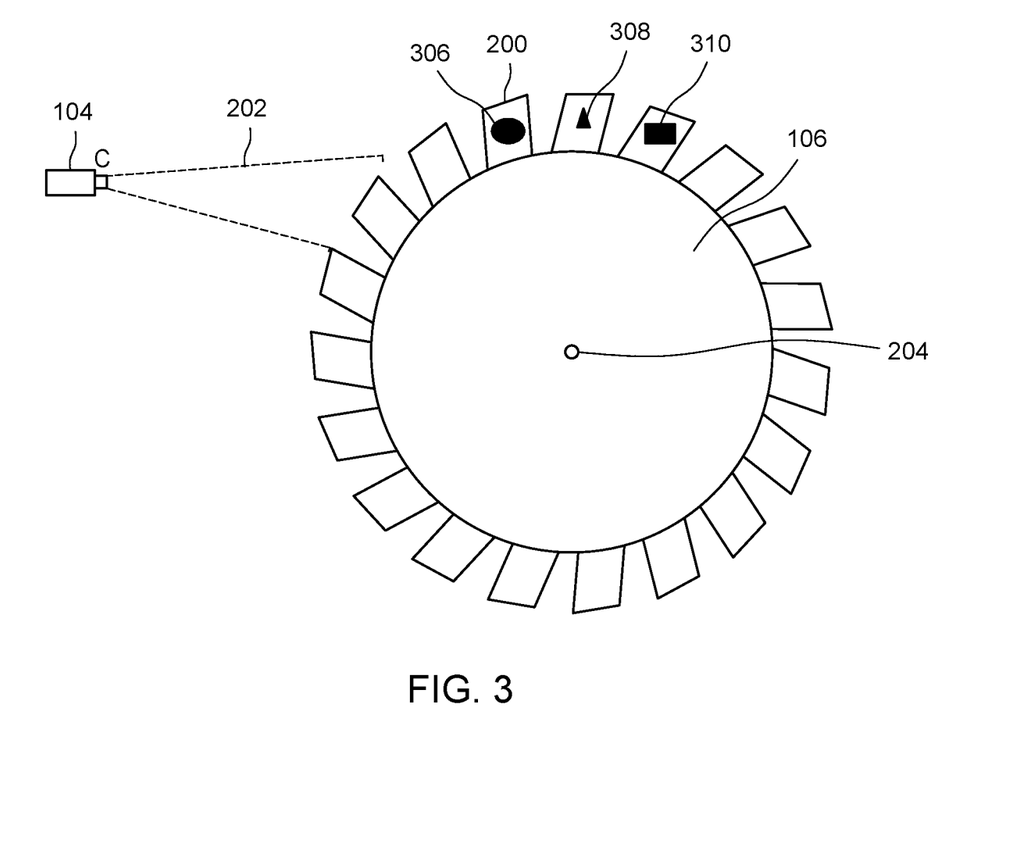
FIG. 3 illustrates the rotary machine shown in FIG. 2 at a later time.

FIG. 3 illustrates the rotary machine 106 shown in FIG. 2 at a later time. The rotary machine 106 shown in FIG. 3 can represent the rotary machine 106 after the passage of time and/or one or more additional operational cycles subsequent to the depiction of the rotary machine 106 shown in FIG. 2. The passage of time and/or additional operational cycles of the rotary machine 106 can increase the distress in one or more of the repeating segments 200 and/or can introduce new distress in one or more of the repeating segments 200. As shown in FIG. 3, three segments 200 are identified by the controller 102 as having distressed or damaged portions 306, 308, 310.

In the illustrated example, the distressed portions 306, 308, 310 in the rotary machine 106 shown in FIG. 3 are the same distressed portions 206, 208, 210 in the rotary machine 106 shown in FIG. 2. The distressed portion 206 has changed size and/or shape to the shape and size of the distressed portion 306, and the distressed portion 210 has changed size and/or shape to the shape and size of the distressed portion 310. The change in size and/or shape could prevent a person or machine learning system to not identify the distressed portion 206 shown in FIG. 3 because the segment 200 having the distressed portion 206 may be mistaken for another segment 200. For example, because the different segments 200 are not otherwise labeled or individually identified (aside from determining the pattern described herein), the person or system may not be able to determine that the same segment 200 has a distressed portion 206 that has changed size and/or shape.

But, the system 100 described herein can use the pattern that is determined to individually identify the segments 200 and/or to individually locate the segments 200. This pattern can be used to consistently identify the segments 200 so that images taken at different times of the same segment 200 can be examined and/or compared for monitoring how distress to one or more of the segments 200 is changing over time.

The system 100 can examine the images provided by the optical sensor 104 of the different segments 200 shown in FIG. 3 to automatically identify the distressed portions 306, 308, 310, as well as the order in which the distressed portions 306, 308, 310 appear in the images provided or otherwise output by the optical sensor 104. If the rotary machine 106 was rotated in a counter-clockwise direction during or between image acquisitions, then the sequence of images examined by the controller 102 reveals the distressed portion 306 followed by the distressed portion 308 followed by the distressed portion 310, with no intervening segments 200. The controller 102 can compare this sequence to the pattern determined from the segments 200 in the state of the rotary machine 106 and determine that both the sequence and the pattern have three consecutive segments 200 with distressed portions.

This match between the sequence and the pattern is used by the controller 102 to determine that the segments 200 having the distressed portions 306, 308, 310 are the same segments 200 that had the distressed portions 206, 208, 210 shown in FIG. 2. The same order of distressed (and, optionally, non-distressed) segments 200 is used by the controller 102 to individually identify the segments 200.

The controller 102 can identify this similarity between the sequence and the pattern as a match between the sequence and the pattern, even if the distressed portions in the sequence differ from the pattern. For example, the distressed portion 306 may have a larger size and/or different shape than the distressed portion 206, and the distressed portion 310 may have a larger size and/or different shape than the distressed portion 210. These types of changes in the distressed portions of the segments 200 may otherwise prevent a person or the system 100 from determining that the distressed portions 306, 308, 310 are the same as or correlate to the distressed portions 206, 208, 210. But, because the controller 102 is examining the order in which some distress appears in the segments 200 during imaging, and not trying to match the size and/or shape of the distress, the controller 102 is able to more accurately locate individual segments 200 in the rotary machine 106.

This can allow the controller 102 to track or monitor progression of the distress in one or more repeating segments 200. For example, the controller 102 can track the progression of the distressed portion 208, 308 by identifying the location of the segment 200 having the distressed portion 208, 308 (e.g., as the middle segment 200 in the pattern of segments 200 that previously was determined). As another example, the controller 102 can track the initiation and/or progression of distress in another segment 200 using the pattern, such as by examining images of the fifteenth (or other) segment 200 that follows the pattern.

In one embodiment, the controller 102 can label the different segments 200 based on the pattern and images. For example, once the controller 102 has matched a sequence of imaged segments 200 with the pattern of imaged segments 200 to individually identify the segments 200, the controller 102 can save the images associated with the same segment 200 in the memory 108 with data that individually identifies the segment 200. This can be used by the controller 102 to later compare the images of the same segment 200 for tracking progression of distress to the segment 200.

The controller 102 can generate an output or warning signal that is provided to the output device 110 shown in FIG. 1. The output device 110 can include an electronic display, speaker, touchscreen, or the like, that visually and/or audibly notifies an operator of the detection of the pattern, of the detection of distressed portions in the segments 200, of the initiation of a distressed portion, of a worsening of a distressed portion, etc. Optionally, the output device 110 can be a communication device, such as a transceiver, transmitter, antenna, modem, or the like, that sends the signal (or another signal) to a repair system 112 via one or more computerized communication networks 114. The networks 114 can represent private or public networks, and optionally may include at least a portion of the Internet. Alternatively, the output device 110 can communicate with the repair system 112 without communicating via the network(s) 114.

The repair system 112 includes a hardware system that implements one or more responsive actions to change a state of the rotary machine 106 responsive to detection of the distressed portions in the repeating segments by the controller 102 and/or responsive to the controller 102 determining that one or more distressed portions reaches a state requiring remediation. As one example, the repair system 112 can automatically schedule or begin repair of a surface of a repeating segment 200, such as by spraying a restorative additive onto a thermal barrier coating on a turbine blade. The repair system 112 can include a robotic spraying system that sprays the coating onto the blade.

Figure 4:
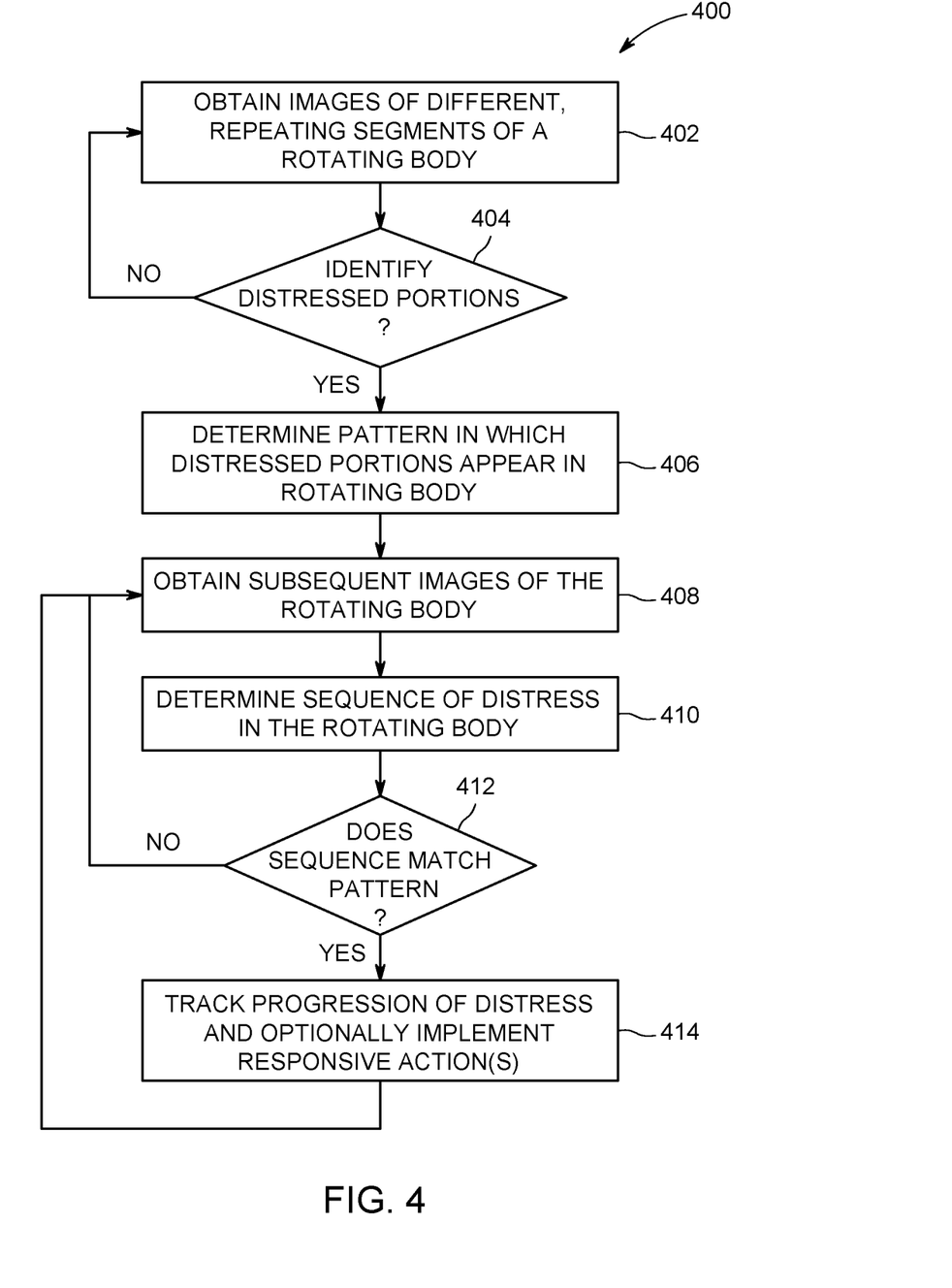
FIG. 4 illustrates a flowchart of one embodiment of a method for in-situ recognition of common locations in a rotatable body having repeatable segments.

FIG. 4 illustrates a flowchart of one embodiment of a method 400 for in-situ recognition of common locations in a rotatable body having repeatable segments. The method 400 can describe the operations performed by the controller 102 to individually identify where different repeating segments 200 are in the rotating body 106. This can allow for the controller 102 to individually track progression of distress in the rotating body 106.

At 402, images of different repeating segments of a rotating or rotatable body are obtained. As described above, these images can depict different parts of the body, such as different blades of a turbine engine. At 404, a determination is made as to whether one or more of the images show distress in the segments. For example, the controller 102 can automatically examine the images to determine if one or more of the turbine blades has chipping, cracks, spalling, or pits. If one or more of the images show distress to a segment of the rotatable body, then flow of the method 400 can proceed toward 406. Otherwise, flow of the method 400 can return toward 402.

At 406, a pattern in which the distressed portions of the repeating segments of the rotatable body appear is determined. As described above, this pattern can describe the sequence of damaged or undamaged segments 200 in the rotatable body 106 as the segments 200 are shown in a sequence of images obtained from the optical sensor 104. At 408, additional images of the segments of the rotatable body are obtained. This additional images can be obtained after the rotatable body has operated through one or more operational cycles or after expiration of a designated period of time. For example, the additional images can be obtained after one or more distressed portions of the segments 200 have worsened.

At 410, a sequence of distress in the rotatable body is determined from the additional images that are obtained. The controller 102 can examine the additional images and determine whether the repeating segments of the rotatable body 106 have distress. The order or sequence in which the images show or do not show the distress can be compared to the previously determined pattern. Different sequences of the images showing segments 200 with distressed portions can be compared with the pattern to determine if any of the sequences match the pattern, even if the distress shown in the images do not exactly match.

At 412, a determination is made as to whether a sequence of the images of the repeating segments of the rotatable body matches the previously determined pattern. For example, the controller 102 can determine if the sequence of distressed and/or non-distressed turbine blades shown in the additional images matches the patterned sequence of distressed and/or non-distressed turbine blades. If a sequence matches the pattern, then the controller 102 can individually identify the repeating segments in the different sets of images (e.g., in the previously acquired images obtained at 402 and in the additional images obtained at 408). Flow of the method 400 can then proceed toward 414. But, if no sequence matches the pattern, then the controller 102 may not be able to individually identify the repeating segments 200. As a result, flow of the method 400 can return toward 408 to obtain additional images or optionally terminate.

At 414, progression of the distress detected in one or more of the repeating segments in the rotatable body is monitored. For example, with the controller 102 being able to individually identify and differentiate the repeating segments 200 from each other, the controller 102 can continue examining images of the same segment 200 to determine if distress in that segment 200 is worsening. Optionally, if the distress worsens enough, the controller 102 can implement one or more responsive actions, such as repairing the distress, replacing the repeating segment, or the like. Flow of the method 400 can return toward 408 or optionally terminate.

In one embodiment, a method includes automatically identifying (using a machine learning system) different distressed portions in repeating segments of a rotating body. At least one of a size and/or a shape of one or more of the distressed portions changes with respect to time. The method also includes determining a pattern of the different distressed portions in the repeating segments of the rotating body during rotation of the rotating body based on identifying the different distressed portions, and subsequently automatically identifying (using the same machine learning system or another machine learning system) locations of individual segments of the repeating segments in the rotating body using the pattern of the distressed portions that is determined.

Optionally, the method also can include tracking changes in the distressed portions of the repeating segments of the rotating body by consistently tracking the locations of the individual segments of the repeating segments in the rotating body during subsequent examinations of the distressed portions of the repeating segments using the pattern that is determined.

Optionally, identifying the locations of the individual segments of the repeating segments occurs after the size, the shape, or both the size and the shape of the one or more distressed portions in the repeating segments of the rotating body changes.

Optionally, the method also can include using the pattern to individually identify, label, or both identify and label each of the repeating segments of the rotating body.

Optionally, the method also can include tracking changes in the size, the shape, or both the size and the shape of the distressed portions of the repeating segments of the rotating body using the pattern that is determined.

Optionally, the method also can include automatically implementing a repair action to change a state of the rotating body from a damaged state to a repaired state by repairing at least one of the distressed portions.

Optionally, the rotating body includes a turbine machine and the repeating segments include turbine blades.

Optionally, the distressed portions of the repeating segments of the rotating body include one or more cracks, spalls, or pits in turbine blades of a turbine machine.

Optionally, the pattern that is determined includes an order in which the different distressed portions of the repeating segments of the rotating body are encountered by the machine learning system during rotation of the rotating body.

Optionally, the pattern that is determined includes a spatial separation gap, a temporal separation gap, or a combination of the spatial separation gap and the temporal separation gap between the different distressed portions of the repeating segments in the rotating body during rotation of the rotating body.

Optionally, automatically identifying the distressed portions of the repeating segments in the rotating body and subsequently automatically identifying the locations of the segments in the rotating body include optically detecting the distressed portions using the machine learning system or the other machine learning system.

Optionally, automatically identifying the distressed portions of the repeating segments in the rotating body and subsequently automatically identifying the locations of the segments of the rotating body occur during rotation of the rotating body in a common direction.

In one embodiment, a system includes one or more processors configured to automatically identify different distressed portions in repeating segments of a rotating body. At least one of a size and/or a shape of one or more of the distressed portions changes with respect to time. The one or more processors also are configured to determine a pattern of the different distressed portions in the repeating segments of the rotating body during rotation of the rotating body based on identifying the different distressed portions. The one or more processors also are configured to subsequently automatically identify locations of individual segments of the repeating segments in the rotating body using the pattern of the distressed portions that is determined.

Optionally, the one or more processors also are configured to track changes in the distressed portions of the repeating segments of the rotating body by consistently tracking the locations of the individual segments of the repeating segments in the rotating body during subsequent examinations of the distressed portions of the repeating segments using the pattern that is determined.

Optionally, the one or more processors are configured to identify the locations of the individual segments of the repeating segments occurs after the size, the shape, or both the size and the shape of the one or more distressed portions in the repeating segments of the rotating body changes.

Optionally, the one or more processors are configured to use the pattern to individually identify, label, or both identify and label each of the repeating segments of the rotating body.

Optionally, the one or more processors also are configured to track changes in the size, the shape, or both the size and the shape of the distressed portions of the repeating segments of the rotating body using the pattern that is determined.

In one embodiment, a method includes automatically identifying (using a machine learning system) plural different damaged blades of a turbine engine. At least one of a size or a shape of damage to one or more of the damaged blades changes with respect to time. The method also includes determining a sequential pattern of the different damaged blades of the turbine engine during rotation of the turbine engine based on identifying the different damaged blades, and subsequently automatically identifying, using the same machine learning system or another machine learning system, the damaged blades of the turbine engine after the size, the shape, or both the size and the shape of the damage to the one or more damaged blades changes.

Optionally, the method also can include automatically implementing a repair action to change a state of the turbine engine from a damaged state to a repaired state by repairing at least one of the damaged blades.

Optionally, the damage to the damaged blades of the turbine engine include one or more cracks, spalls, or pits in the turbine blades.

Optionally, the sequential pattern that is determined includes an order in which the different damaged blades of the turbine engine are encountered by the machine learning system during rotation of the blades.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   automatically identifying, using a machine learning system, different distressed portions in repeating segments of a rotating body, wherein at least one of a size or a shape of one or more of the distressed portions changes with respect to time;
   determining a pattern of the different distressed portions in the repeating segments of the rotating body during rotation of the rotating body based on identifying the different distressed portions; and
   subsequently automatically identifying, using the same machine learning system or another machine learning system, locations of individual segments of the repeating segments in the rotating body using the pattern of the distressed portions that is determined.

2. The method of claim 1, further comprising tracking changes in the distressed portions of the repeating segments of the rotating body by consistently tracking the locations of the individual segments of the repeating segments in the rotating body during subsequent examinations of the distressed portions of the repeating segments using the pattern that is determined.

3. The method of claim 1, wherein identifying the locations of the individual segments of the repeating segments occurs after the size, the shape, or both the size and the shape of the one or more distressed portions in the repeating segments of the rotating body changes.

4. The method of claim 1, further comprising using the pattern to individually identify, label, or both identify and label each of the repeating segments of the rotating body.

5. The method of claim 1, further comprising tracking changes in the size, the shape, or both the size and the shape of the distressed portions of the repeating segments of the rotating body using the pattern that is determined.

6. The method of claim 1, further comprising automatically implementing a repair action to change a state of the rotating body from a damaged state to a repaired state by repairing at least one of the distressed portions.

7. The method of claim 1, wherein the rotating body includes a turbine machine and the repeating segments include turbine blades.

8. The method of claim 1, wherein the distressed portions of the repeating segments of the rotating body include one or more cracks, spalls, or pits in turbine blades of a turbine machine.

9. The method of claim 1, wherein the pattern that is determined includes an order in which the different distressed portions of the repeating segments of the rotating body are encountered by the machine learning system during rotation of the rotating body.

10. The method of claim 1, wherein the pattern that is determined includes a spatial separation gap, a temporal separation gap, or a combination of the spatial separation gap and the temporal separation gap between the different distressed portions of the repeating segments in the rotating body during rotation of the rotating body.

11. The method of claim 1, wherein automatically identifying the distressed portions of the repeating segments in the rotating body and subsequently automatically identifying the locations of the segments in the rotating body include optically detecting the distressed portions using the machine learning system or the other machine learning system.

12. The method of claim 1, wherein automatically identifying the distressed portions of the repeating segments in the rotating body and subsequently automatically identifying the locations of the segments of the rotating body occur during rotation of the rotating body in a common direction.

13. A system comprising:
    one or more processors configured to automatically identify different distressed portions in repeating segments of a rotating body, wherein at least one of a size or a shape of one or more of the distressed portions changes with respect to time, the one or more processors also configured to determine a pattern of the different distressed portions in the repeating segments of the rotating body during rotation of the rotating body based on identifying the different distressed portions, wherein the one or more processors also are configured to subsequently automatically identify locations of individual segments of the repeating segments in the rotating body using the pattern of the distressed portions that is determined.

14. The system of claim 13, wherein the one or more processors also are configured to track changes in the distressed portions of the repeating segments of the rotating body by consistently tracking the locations of the individual segments of the repeating segments in the rotating body during subsequent examinations of the distressed portions of the repeating segments using the pattern that is determined.

15. The system of claim 13, wherein the one or more processors are configured to identify the locations of the individual segments of the repeating segments occurs after the size, the shape, or both the size and the shape of the one or more distressed portions in the repeating segments of the rotating body changes.

16. The system of claim 13, wherein the one or more processors are configured to use the pattern to individually identify, label, or both identify and label each of the repeating segments of the rotating body.

17. The system of claim 13, wherein the one or more processors also are configured to track changes in the size, the shape, or both the size and the shape of the distressed portions of the repeating segments of the rotating body using the pattern that is determined.

18. A method comprising:
    automatically identifying, using a machine learning system, plural different damaged blades of a turbine engine, wherein at least one of a size or a shape of damage to one or more of the damaged blades changes with respect to time;
    determining a sequential pattern of the different damaged blades of the turbine engine during rotation of the turbine engine based on identifying the different damaged blades; and subsequently automatically identifying, using the same machine learning system or another machine learning system, the damaged blades of the turbine engine after the size, the shape, or both the size and the shape of the damage to the one or more damaged blades changes.

19. The method of claim 18, further comprising automatically implementing a repair action to change a state of the turbine engine from a damaged state to a repaired state by repairing at least one of the damaged blades.

20. The method of claim 18, wherein the damage to the damaged blades of the turbine engine include one or more cracks, spalls, or pits in the turbine blades.

21. The method of claim 18, wherein the sequential pattern that is determined includes an order in which the different damaged blades of the turbine engine are encountered by the machine learning system during rotation of the blades.

* * * * *